United States Patent [19]
Forbes

[11] 3,831,558
[45] Aug. 27, 1974

[54] WATER FOUNTAIN FOR ANIMALS

[75] Inventor: Alden O. Forbes, Colorado Springs, Colo.

[73] Assignee: North 40 Manufacturing Inc., Colorado Springs, Colo.

[22] Filed: Aug. 16, 1973

[21] Appl. No.: 388,818

[52] U.S. Cl................................. 119/73, 119/75
[51] Int. Cl.............................................. A01k 7/00
[58] Field of Search............ 119/75, 73; 239/24, 28, 239/29, 29.5

[56] References Cited
UNITED STATES PATENTS

| | | | |
|---|---|---|---|
| 1,228,224 | 5/1917 | Luke et al. | 119/75 |
| 2,469,946 | 5/1949 | Bremer | 119/75 |
| 3,547,083 | 12/1970 | Peterson | 119/75 |

*Primary Examiner*—Louis G. Mancene
*Assistant Examiner*—J. N. Eskovitz

[57] ABSTRACT

An animal watering fountain having a water containing basin supported by a stanchion imbedded in the earth for support and containing the water conduit which is connected to a water source, and including intake and drain valves, the former of which is operated by an animal which depresses a valve actuator lever disposed within the water basin.

1 Claim, 5 Drawing Figures

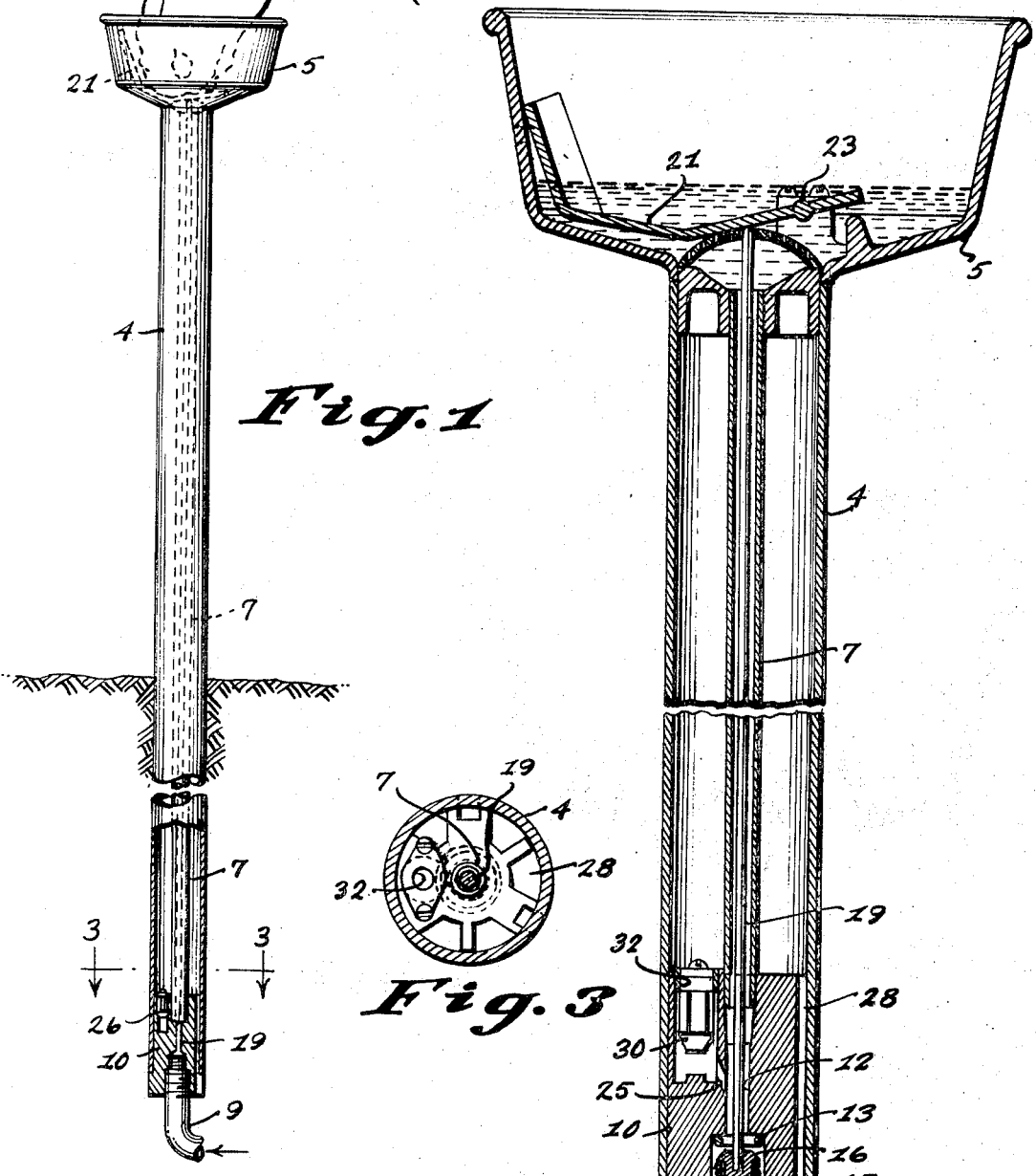

WATER FOUNTAIN FOR ANIMALS

Customarily, drinking water is supplied for horses and other domestic animals in a trough or similar recepticle which is filled periodically. Although such a device represents the ultimate in simplicity, it is attended by several disadvantages foremost of which is the freezing of the water. Another disadvantage is the necessity to maintain a substantial quantity of water in the trough which tends to become dirty and polluted.

It is the primary object of the present invention to overcome these disadvantages by providing a drinking fountain for animals which is self-draining and will not freeze in the winter and which can be actuated by the animal so as to furnish sufficient water for the animal's requirements but no more.

Other and further objects, features and advantages of the invention will become apparent upon reading the following detailed description of a preferred form of the invention taken in connection with the accompanying drawings in which:

FIG. 1 is an elevational view of the animal watering fountain of the present invention showing the stanchion thereof imbedded in the earth and a portion thereof broken away and shown in cross section to more clearly reveal the interior thereof.

FIG. 2 is an enlarged vertical cross sectional view of the fountain showing the intake valve in the open position.

FIG. 3 is a cross sectional view of the stanchion taken along lines 3—3 of FIG. 1.

Figure 4:
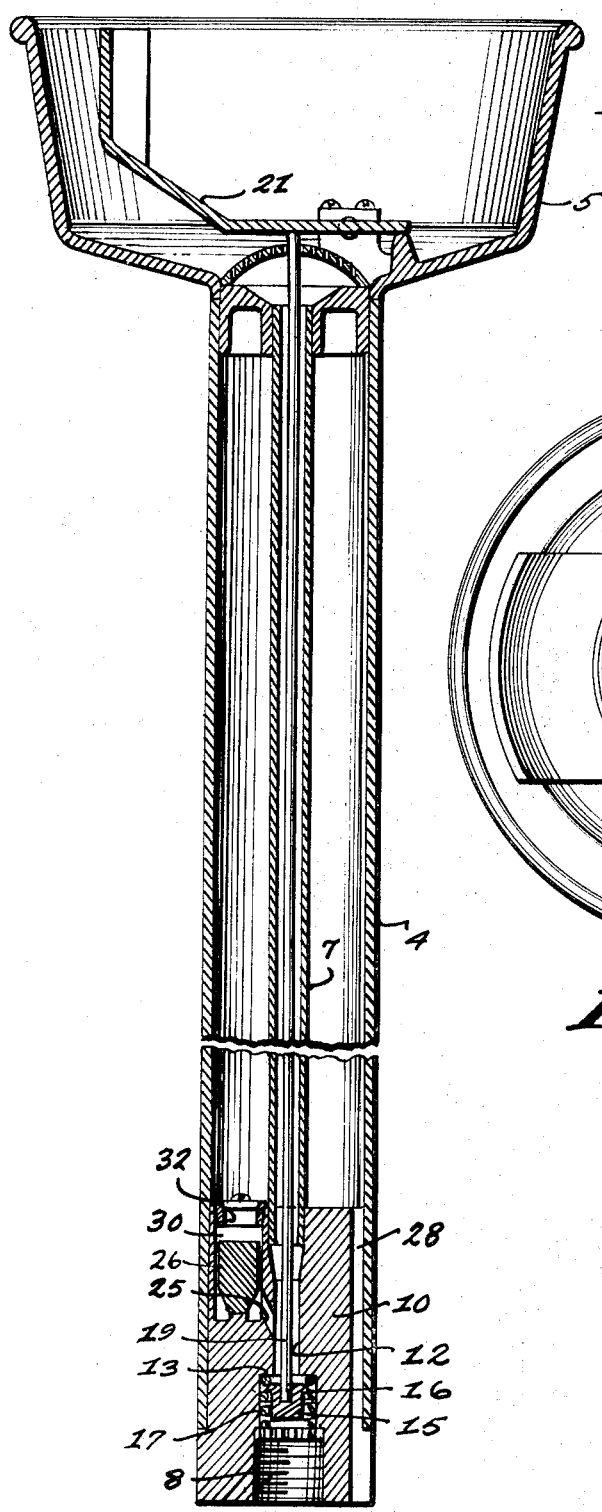
FIG. 4 is a vertical cross section of the fountain showing the intake valve in the closed position.
Figure 5:
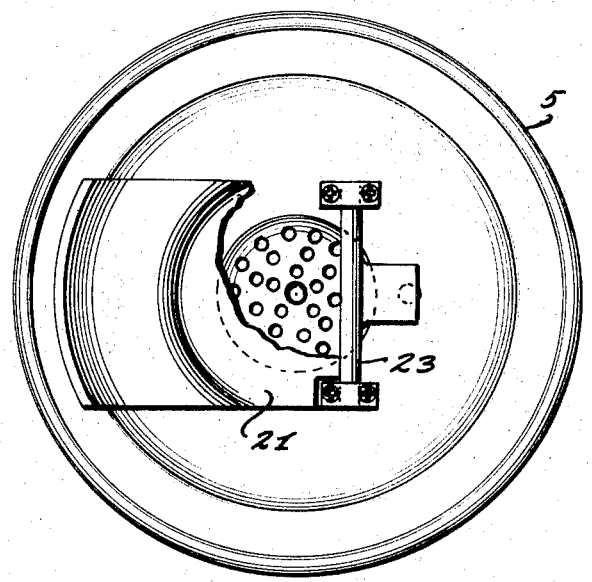
FIG. 5 is a top view of the basin of the watering fountain with a portion of the nezzle broken away.

The fountain 2 of the present invention, as seen in FIGS. 1, 2 and 4, includes a stanchion 4 supporting a basin 5. Centrally disposed in the stanchion 4 is a conduit 7 for carrying water from a source 9 to the basin 5.

An intake valve and a drain system are located in the lower portion of the stanchion 4 which is preferrably dimensioned so that these structures can be located below the frost line underground so as not to be subject to freezing. The intake valve structure includes a body 10 which fits tightly within the stanchion 4 and which has a central bore 12 which receives, at its uppermost end, the lower end of the conduit 7. The lower end of the bore 12 is fitted with threads 8 or other convenient means for connecting a conduit 9 representing a source of water which is under sufficient pressure to allow the water to rise in the stanchion conduit 7 and fill the basin 5.

The bore 12 in the body 10 of the valve assembly has an enlarged diameter lower portion and a reduced diameter upper portion forming a valve seat 13 therebetween. A valve piston 15 having an annular shoulder 16 is disposed within the said larger diameter portion and is adapted to move longitudinally therein so that the shoulder 16 may bear against and form a sealing engagement with the valve seat 13.

The valve piston 15 is actuated against the force of a piston biasing spring 17 by a rod 19 which is attached at its lower end to the piston 15. The biasing spring 17 rests on a perforated platform 18 secured within the bore 12. The valve actuating rod 19 is disposed coaxially within the water carrying conduit 7. The upper end of the rod 19 projects out of the conduit 7 and into the basin 5 where it comes into contact with the bottom surface of a nezzle 21. The nezzle 21 is a shovel-shaped lever which is pivotally mounted at 23 in the bottom of the basin and generally adapted to embrace the nose of a horse or similar animal which comes to drink at the fountain.

As the horse presses downwardly on the nezzle 21, the rod 19 is depressed, thus opening the valve and allowing the passage of water past the valve piston 15 and into the conduit 7 to thereby fill the basin. Water will continue to flow into the basin as long as the animal continues to drink and simultaneously depress the nezzle 21.

When pressure on the nezzle 21 is released, the spring 17 closes the valve piston 15 against the valve seat 13. Any water remaining in the basin will run back down through the conduit 7, but not being able to travel back through the valve 25, it will be diverted into the lateral path 25 in the body 10 and around the check valve 26 into the interior of the stanchion 4. A plurality of channels 28 are provided around the periphery of the valve body 10 to enable the water to seep out of stanchion 4 and into the surrounding earth.

The check valve 26 is located in a chamber 30 having top and bottom openings which, respectively, establish communication with the interior of the stanchion and the lateral path 25 in the body 10 of the valve assembly.

The check valve 26, when subjected to the pressure of the incoming water which arrives through the valve 15, as shown in FIG. 2, will rise in the chamber 30 and obstruct the opening 32 in the top thereof, so as not to allow incoming water into the stanchion 4. When drain water comes down through the conduit, however, (FIG. 4) there is insufficient pressure to lift the check valve and the drain water passes around the check valve 26 and out through the opening 32.

I claim:
1. An animal watering fountain comprising:
   a water holding basin
   vertical support means for said basin comprising a tubular member having a coaxial water-carrying conduit therein and where an annular interspace is defined between the said tubular member and the conduit, and wherein the said conduit is in communication with the interior of the water basin,
   a source of water;
   first valve means interconnecting the conduit and the source of water;
   a reciprocable actuator rod attached to the first valve means and disposed within the said conduit;
   a depressable lever pivotally mounted within the basin and in operable contact with the actuator rod;
   normally open second valve means disposed in the lower end portion of the support means interconnecting the conduit and the said annular interspace, said valve responsive to incoming water source pressure to close;
   at least one opening in the lower portion of the tubular member establishing communication between the annular interspace and the outside of the tubular member defining a drain passage.

* * * * *